(12) United States Patent
Sanderson

(10) Patent No.: US 12,007,207 B2
(45) Date of Patent: Jun. 11, 2024

(54) DIRECT ACTION RESTRAINING TAG

(71) Applicant: David Sanderson, Monument, CO (US)

(72) Inventor: David Sanderson, Monument, CO (US)

( * ) Notice: Subject to any disclaimer, the term of this patent is extended or adjusted under 35 U.S.C. 154(b) by 625 days.

(21) Appl. No.: 17/248,279

(22) Filed: Jan. 18, 2021

(65) Prior Publication Data
US 2022/0228842 A1 Jul. 21, 2022

(51) Int. Cl.
*F41H 13/00* (2006.01)
*B60R 25/01* (2013.01)

(52) U.S. Cl.
CPC ......... *F41H 13/0093* (2013.01); *B60R 25/01* (2013.01)

(58) Field of Classification Search
CPC ............. F41H 13/0012; F41H 13/0031; F41H 13/0043; F41H 13/0068; F41H 13/0075; F41H 13/0093; F42B 12/36; B60R 25/00; B60R 25/01; B60R 25/04; B60R 25/045
USPC ........................................... 89/1.11; 102/502
See application file for complete search history.

(56) References Cited

U.S. PATENT DOCUMENTS

| | | | | |
|---|---|---|---|---|
| 5,907,290 A * | 5/1999 | Turner | ..................... | F41H 11/08 340/5.1 |
| 6,072,248 A * | 6/2000 | Muise | ..................... | B60R 25/04 340/426.12 |
| 6,470,260 B2 * | 10/2002 | Martens | .................. | G08G 1/017 340/904 |
| 7,111,559 B1 * | 9/2006 | MacLachlan | ........... | F42B 12/36 361/232 |
| 7,453,356 B2 * | 11/2008 | Bedenko | ................ | G08G 1/127 701/519 |
| 7,990,265 B2 * | 8/2011 | Fischbach | ............. | F42B 12/382 340/539.1 |
| 10,088,278 B1 * | 10/2018 | Tanielian | ............ | F41H 13/0093 |
| 10,962,335 B2 * | 3/2021 | Holihan | ................ | H04K 3/825 |
| 2003/0137448 A1 * | 7/2003 | Brydges | ................ | G01S 5/0027 342/357.36 |
| 2008/0178758 A1 * | 7/2008 | Kapeles | .................. | F42B 12/40 102/502 |
| 2011/0203476 A1 * | 8/2011 | Smogitel | ................. | F42B 12/36 102/501 |
| 2017/0261292 A1 * | 9/2017 | Armstrong | ............. | F41H 11/02 |

* cited by examiner

Primary Examiner — Bret Hayes
(74) Attorney, Agent, or Firm — Trenner Law Firm, LLC; Mark Trenner

(57) ABSTRACT

A direct action restraining tag apparatus is disclosed for interfering with normal operation of a motor vehicle. An example restraining tag includes a housing having an internal compartment. The example restraining tag also includes a pulse mechanism disposed within the internal compartment. The pulse mechanism includes a transmitter configured to generate one or both of a radio frequency pulse and an electromagnetic pulse having a magnitude sufficient to interfere with normal operation of an electronic control module of a motor vehicle.

15 Claims, 2 Drawing Sheets

DIRECT ACTION RESTRAINING TAG

BACKGROUND

Law enforcement agencies aim to reduce the frequency and duration of vehicle pursuits in an effort to keep their officers and civilians safe. According to a Bureau of Justice Statistics report of police vehicle reports in 2012-2013, there were approximately 68,000 pursuits of motor vehicles in the United States by police officers. Those pursuits resulted in nearly one fatality per day.

There are many known methods for disabling a motor vehicle during a pursuit including, but not limited to, the Pursuit Intervention Technique (or "PIT maneuver"), spike strips, etc. Although many of these techniques may ultimately terminate a pursuit, they can also increase the danger of the pursuit at least for a brief period of time. For example, a spike strip or PIT maneuver may cause the suspect vehicle to lose control and veer into traffic, structures, etc. and cause harm to people and property before coming to a stop. Therefore, a need remains for a device which can terminate a vehicle pursuit without causing the suspect vehicle to lose control.

DETAILED DESCRIPTION

A restraining tag is disclosed which includes a pulse mechanism that can be temporarily affixed to a suspect vehicle for the purpose of disabling one or more of the vehicle's electronic systems with an energy pulse. The purpose of such a restraining tag is to be a non-lethal, direct, and/or preemptive option to eliminate the possibility of a suspect vehicle evading police or causing damage. This is accomplished through disablement via a controlled directional electromagnetic pulse ("EMP") and/or radio frequency pulse.

Either an electromagnetic or microwave pulse, or both, of suitable magnitude may interfere with operation of a target vehicle for a sufficient length of time for the driver to be apprehended, but oftentimes has no permanent impact on the vehicle. In this regard, damage resulting from termination of a pursuit may be minimized, even to the target vehicle itself. In contrast, existing pursuit termination measures such as spike strips and PIT maneuvers result in damage.

In an example, the pulse mechanism may be disposed in a projectile that can be deployed through use of a mounted platform or a mobile launcher, such as those commonly used by military and police personnel to launch foam projectiles and gas canisters.

In an example, a system is disclosed for interfering with operation of a motor vehicle. The system may include a restraining tag as described above, and a launcher. The launcher may include a barrel having a diameter corresponding to an outer diameter of the housing, for example, about 37 mm to about 40 mm.

In another example, the system may include a pursuit vehicle such that the launcher may be disposed upon a forward-facing portion of the pursuit vehicle. For example, a launcher may be positioned within a front-grille of a police vehicle, with a trigger mechanism disposed inside the vehicle for access by an officer during pursuit. Alternatively or additionally, the launcher may be an M203 grenade launcher configured for hand-held operation by a user.

Before continuing, it is noted that as used herein, the terms "includes" and "including" mean, but is not limited to, "includes" or "including" and "includes at least" or "including at least." The term "based on" means "based on" and "based at least in part on."

It is also noted that although described herein as the device may be implemented for law enforcement and military applications for disablement of motor vehicles, other end-use cases are also contemplated. A variety of end-use cases now known or later developed, will be readily apparent to those having ordinary skill in the art after becoming familiar with the teachings herein.

Furthermore, the operations shown and described herein are provided to illustrate example implementations. It is noted that the operations are not limited to the ordering shown. Still other operations may also be implemented.

Figure 1:
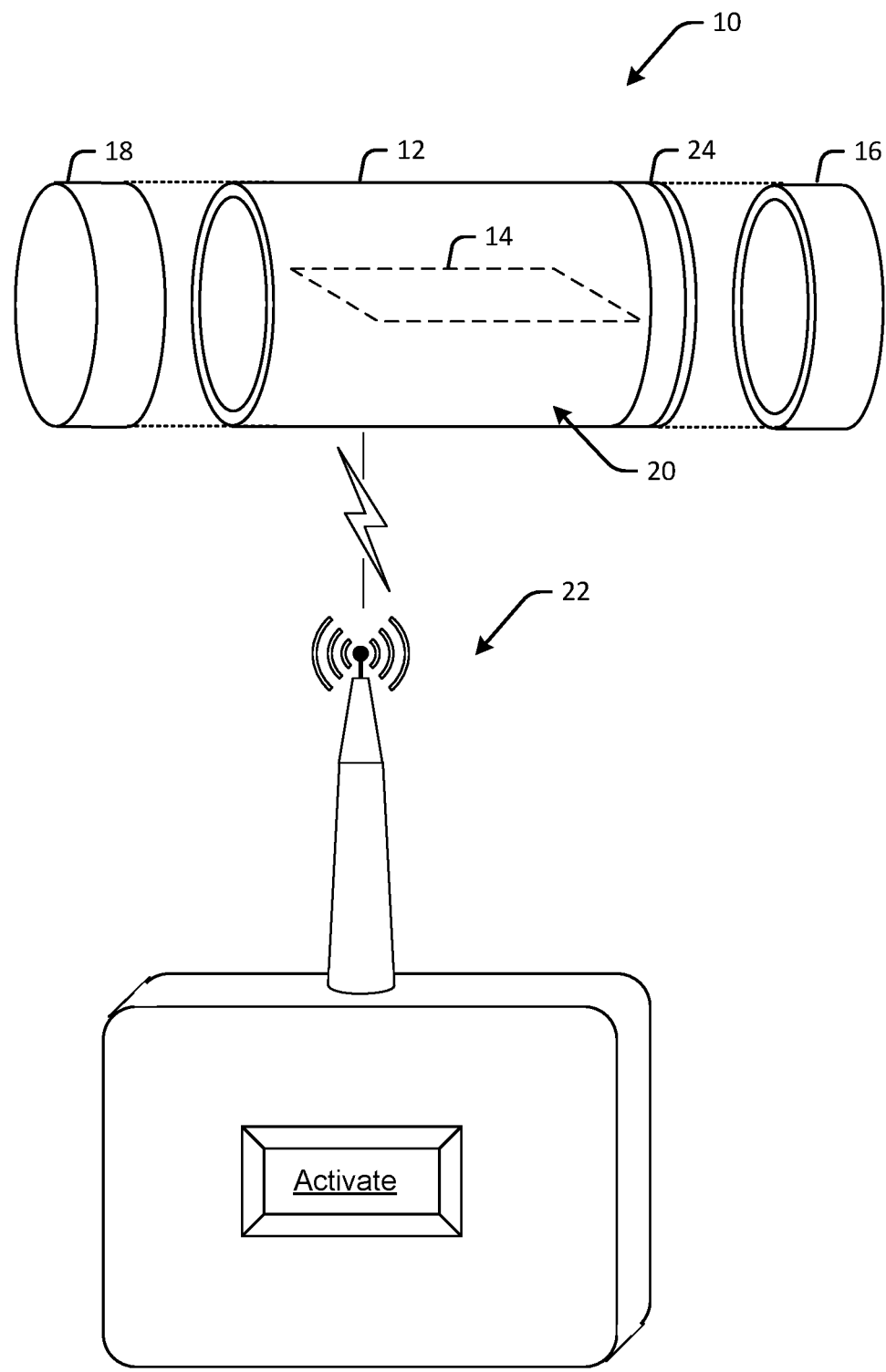
FIG. 1 is an exploded view of an example direct action restraining tag apparatus.

FIG. 1 is an exploded view of an example direct action restraining tag apparatus 10. In an example, the direct action restraining tag apparatus 10 (also abbreviated herein as "restraining tag 10") is provided as it may be implemented for interfering with normal operation of a motor vehicle, e.g., to deter or stop high-speed pursuits. The example restraining tag 10 includes a housing 12, a pulse mechanism 14, a propulsion unit 16, and an adhesion unit 18.

In an example, a remote control unit 22 may also be provided for remotely activating pulse mechanism 14 of the restraining tag 10. In another example, however, the pulse mechanism 14 may be self-activating (e.g., based on timer input, impact, etc.

In an example, the housing 12 includes an internal compartment 22 in which the pulse mechanism 14 is disposed. The housing 12, and the restraining tag 10 overall, may have any appropriate dimensions that facilitate the features of housing the pulse mechanism 14, permitting mobile deployment, and securely affixing (e.g., via adhesion unit 18) to a target vehicle.

In an example, the restraining tag 10 is similar in size and shape to a commonly used police or military cartridge such as about a 40 mm grenade. In this regard, the restraining tag 10 may be substantially cylindrical with a diameter greater than about 35 mm and less than about 40 mm, such that it may be used with existing M203 or similar launchers.

In an example, the restraining tag 10 may have an overall length of at least about 4 inches and no more than about 8 inches, although smaller and larger lengths are contemplated. The size may be dependent, in part, upon the dimensions of the selected pulse mechanism 14. In this regard, the restraining tag 10 may have a length of at least about 12 inches, at least about 18 inches, or more in order to house a pulse mechanism 14 having sufficient magnitude to interfere with a target vehicle.

In an example, the adhesion unit 18 may include an impact pad disposed on a forward end of housing 12. The impact pad may provide a surface coated with an adhesive for engagement of a target vehicle. Notably, the impact pad may be an integral part of housing 12.

At an opposite end of the housing 12 from the impact pad is the propulsion unit 16. The propulsion unit 16 may be any suitable means for propelling the restraining tag 10 from a launcher, for example, a detonation charge. In an example, the propulsion unit 16 is removably replaceable via threads 24 of the housing 12 which engage corresponding threads (not shown) of propulsion unit 16. In other examples, the propulsion unit 16 may snap-fit to housing 12 or may be an integral part thereof.

In an example, the adhesion unit 18 may include a compressible impact pad affixed to the housing 12 on a first side of the impact pad. The impact pad may serve to absorb some impact force when the projectile (i.e., the restraining tag 10) impacts a target vehicle. This may soften the impact, reducing the potential for damage to the vehicle while also preventing the restraining tag from rebounding off the target vehicle. The impact pad may support an adhesive on a second side of the impact pad opposite the first side. In this regard, the forward-most surface of the restraining tag 10 may be coated in a strong adhesive which immediately adheres to the target vehicle upon impact, thereby retaining the restraining tag 10 in contact with the target vehicle.

The propulsion unit 16 may include one or more of the following features alone or in combination to propel the restraining tag 10 from a launcher toward a target vehicle. The propulsion unit 16 may include a surface engageable by a corresponding movable surface of a launcher to propel the restraining tag 10 from the launcher toward a motor vehicle. In an example, the launcher provides the means for propelling the restraining tag 10 rather than having a charge or spring mechanism in the restraining tag 10 itself. In other examples, the propulsion unit 16 may include a fuel and an ignition source that is activatable by a launcher to ignite the fuel and propel the restraining tag 10 from the launcher. In this regard, a charge comprising an ignitable fuel may combust in a launcher, increasing a pressure between a portion of the launcher and the housing 12 of the restraining tag 10, thereby propelling the restraining tag 10 from the launcher.

The propulsion unit 16 may be disposed at a first end of the housing 12 and the adhesion unit 18 may be disposed at a second end of the housing 12 opposite the first end. Notably, in some embodiments the propulsion unit 16 may be omitted, for example, if a launcher itself provides a means for propelling the restraining tag toward a target vehicle.

In an example, the launcher may provide a mechanism for activating a coiled spring in the propulsion unit 16 to release the stored energy and propel the restraining tag 10 from the launcher. For example, a standard charge may be provided in the launcher, as used with launchable grenades or crowd-control gas cartridges. In an example, a propulsion unit may include a spring mechanism capable of converting stored energy into kinetic energy sufficient to propel the restraining tag from a launcher when the spring mechanism is activated by the launcher. For example, a coiled spring may be compressed and stored in a compressed configuration within the propulsion unit.

In an example, a propulsion unit 16 may be reusable (e.g., the spring may be re-compressed and re-stored) and in others a propulsion unit 16 may be a one-time use device which is replaceable. For example, the propulsion unit 16 may be removably attachable to the housing 12 and configured for a single deployment before replacement with a second propulsion unit (not shown, but similar to unit 16) for reuse of the restraining tag 10.

In an example, the launcher (not shown) may include a scope, sight, or other targeting mechanism for aligning the bore of a barrel with a target vehicle. The bore of the launcher may be sized substantially similar to the housing 12. For example, in an embodiment in which housing 12 has a diameter of 37 mm, the bore of the launcher may also have a diameter of about 37 mm to facilitate range and accuracy during deployment of the restraining tag.

In an example, the launcher is affixed to a front-grille area of the pursuit vehicle. However, it should be appreciated that the launcher may be mounted in any appropriate location such as on the roof of the pursuit vehicle. The pursuit vehicle may be any suitable vehicle such as, but not limited to, an SUV, a motorcycle, aircraft, drone, etc.

In an example, the launcher may include sensors for gauging a distance between the pursuit vehicle and a target vehicle and may adjust the trajectory of the restraining tag accordingly. A trigger mechanism (e.g., button) may be disposed inside of the pursuit vehicle for activation of the launcher.

Before continuing, it should be noted that the examples described above are provided for purposes of illustration, and are not intended to be limiting. Other devices and/or device configurations may be utilized to carry out the operations described herein.

Figure 2:
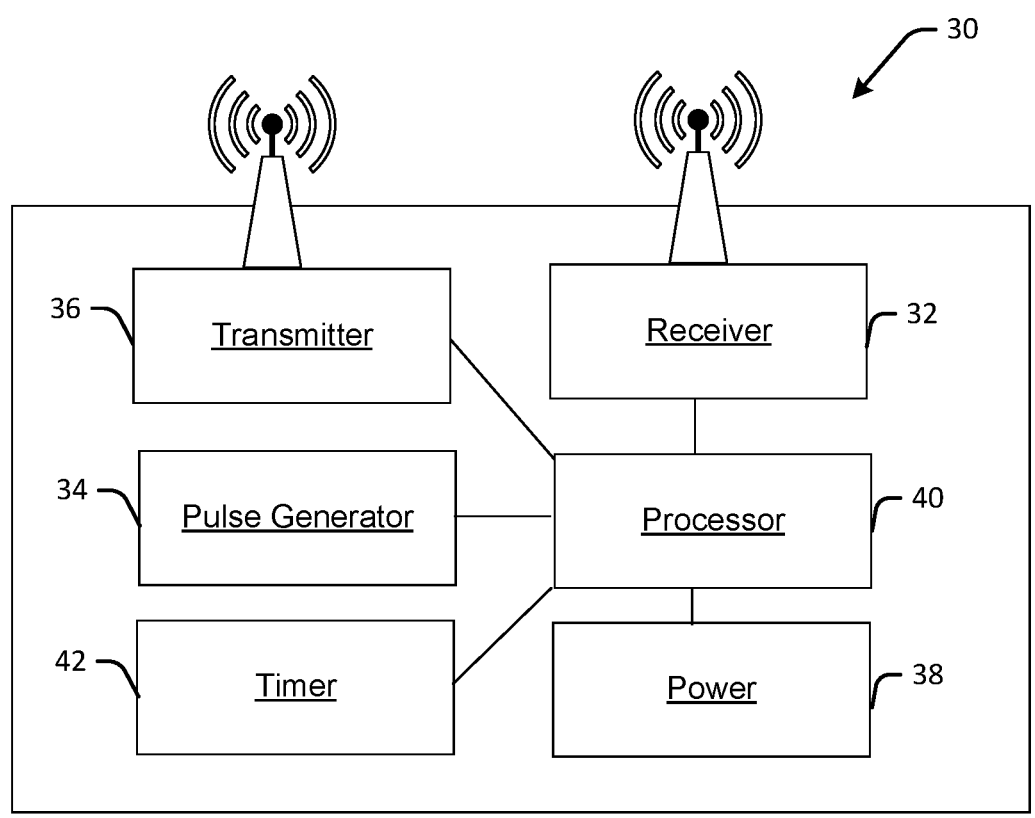
FIG. 2 is a block diagram illustrating components of an example circuit which may be implemented by the direct action restraining tag apparatus.

FIG. 2 is a block diagram illustrating components of an example circuit 30 which may be implemented as all or part of a pulse mechanism 20 of the direct action restraining tag apparatus 10. An example of the circuit 30 includes a receiver 32 (e.g., to receive a remote activation signal from remote control 22), a pulse generator 34 (e.g., to generate an output signal to interfere with normal operation of a vehicle), a transmitter 36 (e.g., to output the signal to interfere with normal operation of a vehicle), and a power source 38 (e.g., a battery). Optionally, the circuit 30 may also include an onboard processor 40 (e.g., a microprocessor or other controller) and a timer 42 (e.g., for automatically actuating the pulse mechanism and/or timing output by the transmitter 36).

In an example, the transmitter 36 and/or related control circuitry is configured to generate one or both of a radio frequency pulse and an electromagnetic pulse. The one or both pulses may have a magnitude sufficient to interfere with normal operation of an electronic control module, or other electrical system, of a motor vehicle.

During operation, the circuit 30 may be operable to receive an activation signal from a wireless transmitter (e.g., remote control 22 in FIG. 1). The activation signal may be operable to activate the pulse mechanism to interfere with operation of the vehicle. In this regard, the restraining tag 10 may be deployed (e.g., launched from a launcher and secured to a vehicle via the adhesive) but may remain inactive while a user (e.g., law enforcement office) assesses the pursuit situation and waits for an opportune moment to activate it. Upon selection of an appropriate time for activation, the law enforcement officer may send an activation signal from a remote control 22, in response to which the pulse mechanism may activate to interfere with operation of the target vehicle.

In an example the pulse mechanism may be activated upon or prior to deployment from a launcher. In another example, the launcher may initiate activation of the pulse mechanism on a delayed basis. For example, upon activation of a trigger associated with a launcher by a user, the launcher may activate a timer on the pulse mechanism (e.g., about 5 seconds) prior to deploying the restraining tag. The delay may provide a sufficient amount of time for the restraining tag to travel out of range of a pursuit vehicle(s) and into range of the target vehicle to ensure the pulse only interferes with the target vehicle.

In an example, if an initial pulse fails to successfully interfere with the target vehicle, the user may be able to send additional activation signals to further attempt interference.

An electromagnetic pulse of roughly 25 kv/m can affect the microprocessors and controllers associated with electrical systems of some modern motor vehicles. However, there is a wide range of vulnerabilities associated with different vehicles due to inherent electrical shielding from the body of the vehicle, housings of electrical systems, and/or coatings on wires. Thus, a pulse exceeding 30 kv/m or more may be desired to improve the success rate of a pulse mechanism.

Proximity of the pulse mechanism to a particular electrical controller may also be a factor in the effectiveness of a pulse. Given that most electronics of most vehicles are disposed near the front, a pulse mechanism engaged with the rear of a vehicle may need a pulse of larger magnitude than if the pulse mechanism were engaged with the front of the vehicle. Accordingly, it is contemplated the electromagnetic pulse mechanisms may operate at 50 kv/m or more.

A microwave pulse may be implemented as an alternative, or in addition, to an electromagnetic pulse. L Band (1 to 2 GHz) and S Band (2 to 4 GHz) energy pulses disrupt vehicle electronics. Microwaves are effective at ranges of over 50 meters to over 100 meters, and even exceeding several hundred meters.

In an example, the pulse mechanism may create a focused, directional electromagnetic pulse and/or radio frequency pulse which confuses electronic systems of the vehicle, thereby slowing or disabling it. By utilizing a focused, directional pulse which may be limited in magnitude, the effects of the pulse may be constrained to the target vehicle to prevent collateral effects to surrounding traffic and/or the police vehicles engaged in the pursuit.

It is noted that the examples shown and described are provided for purposes of illustration and are not intended to be limiting. Still other examples are also contemplated.

The invention claimed is:

1. A direct action restraining tag apparatus for interfering with normal operation of a target vehicle, comprising:
   a housing having an internal compartment;
   a pulse mechanism disposed within the internal compartment, the pulse mechanism including a transmitter configured to generate a radio frequency pulse having a magnitude sufficient to interfere with normal operation of an electronic control module of the target vehicle;
   an adhesion unit disposed at a second end of the housing opposite a first end of the housing, wherein the adhesion unit comprises a compressible impact pad affixed to the housing on a first side of the impact pad, the impact pad supporting an adhesive on a second side of the impact pad opposite the first side.

2. The apparatus of claim 1, further comprising a propulsion unit disposed at the first end of the housing.

3. The apparatus of either claim 2, wherein the propulsion unit comprises a surface engageable by a corresponding movable surface of a launcher to propel the apparatus from the launcher toward the target vehicle.

4. The apparatus of claim 3, wherein the propulsion unit comprises a fuel and an ignition source that is activatable by a launcher to ignite the fuel and propel the apparatus from the launcher.

5. The apparatus of claim 2, wherein the propulsion unit is removably attachable to the housing and configured for a single deployment before replacement with a second propulsion unit for reuse of the pulse mechanism.

6. The apparatus of any one of claim 2, wherein the propulsion unit comprises a spring mechanism capable of converting stored energy into kinetic energy sufficient to propel the apparatus from a launcher when the spring mechanism is activated by the launcher.

7. The apparatus of claim 1, further comprising:
   an antenna, wherein the antenna is operable to receive an activation signal from a wireless transmitter; and
   wherein the activation signal is operable to activate the pulse mechanism.

8. The apparatus of claim 1, wherein the housing has a diameter greater than about 35 mm and less than about 40 mm.

9. The apparatus of claim 1, wherein the apparatus has an overall length of at least about 4 inches and no more than about 18 inches.

10. The apparatus of claim 1, wherein the pulse mechanism is configured to remain inactive upon launch and adhesion to the target vehicle until activated by a law enforcement officer.

11. The apparatus of claim 1, wherein the pulse mechanism is configured to automatically activate upon or prior to deployment from a launcher.

12. The apparatus of claim 1, wherein the pulse mechanism is configured to be initiated by a launcher on a delay, wherein the delay provides time for the housing to travel out of range of a pursuit vehicle and into range of the target vehicle to ensure the pulse only interferes with the target vehicle.

13. The apparatus of claim 1, wherein the pulse mechanism is configured to receive additional activation signals to further attempt interference with the target vehicle.

14. The apparatus of claim 1, wherein the pulse mechanism is configured to output an electromagnetic pulse of about 25 kv/m to about 50 kv/m to affect microprocessors and controllers associated with electrical systems of the target vehicle.

15. The apparatus of claim 1, wherein the pulse mechanism is configured to output a microwave energy pulse in the L Band (1 to 2 GHz) and/or S Band (2 to 4 GHz) to disrupt electronics of the target vehicle.

* * * * *